United States Patent
Kim et al.

(10) Patent No.: US 7,491,353 B2
(45) Date of Patent: Feb. 17, 2009

(54) BOREABLE PLAIN BEARING MATERIAL

(75) Inventors: Michael Kim, Marlton, NJ (US); Derek Semple Marsella, Jackton by East Kilbride (GB); Janette Johnston, Kilmarnock (GB)

(73) Assignee: Glacier Garlock Bearings, Inc., Thorofare, NJ (US)

( * ) Notice: Subject to any disclaimer, the term of this patent is extended or adjusted under 35 U.S.C. 154(b) by 671 days.

(21) Appl. No.: 10/792,429

(22) Filed: Mar. 3, 2004

(65) Prior Publication Data

US 2004/0228555 A1    Nov. 18, 2004

Related U.S. Application Data

(60) Provisional application No. 60/451,500, filed on Mar. 3, 2003.

(51) Int. Cl.
*B32B 27/02* (2006.01)
*B32B 15/08* (2006.01)
*C08L 27/20* (2006.01)

(52) U.S. Cl. .................. 264/112; 264/127

(58) Field of Classification Search ........... 264/112, 264/127
See application file for complete search history.

(56) References Cited

U.S. PATENT DOCUMENTS

| | | | |
|---|---|---|---|
| 4,592,782 A | | 6/1986 | Davies |
| 4,740,340 A | * | 4/1988 | Pratt et al. .......... 264/127 |
| 4,985,296 A | | 1/1991 | Mortimer |
| 5,019,308 A | | 5/1991 | Pratt et al. |
| 5,153,253 A | * | 10/1992 | Moisey et al. .......... 524/439 |
| 5,518,012 A | | 5/1996 | Dolan et al. |
| 5,665,825 A | | 9/1997 | Davies et al. |
| 5,697,390 A | * | 12/1997 | Garrison et al. .......... 132/321 |
| 5,911,514 A | | 6/1999 | Davies et al. |
| 6,068,931 A | | 5/2000 | Adam et al. |
| 6,117,556 A | | 9/2000 | Tamaru et al. |
| 6,461,679 B1 | | 10/2002 | McMeekin et al. |

FOREIGN PATENT DOCUMENTS

| | | |
|---|---|---|
| DE | 42 27 909 A1 | 2/1994 |
| GB | 1156035 | 6/1969 |
| GB | 2 121 722 A | 1/1984 |
| WO | WO 00/08346 | 2/2000 |

OTHER PUBLICATIONS

International Search Report mailed Aug. 10, 2004 corresponding to PCT/US2004/006439.

* cited by examiner

*Primary Examiner*—Mary Lynn F Theisen
(74) *Attorney, Agent, or Firm*—Holland & Hart LLP

(57) ABSTRACT

A bearing, plastic bearing material, and a method for the production thereof are described. The bearing comprises a continuous consolidated bearing material layer impregnated into a porous layer, which is in turn mounted on a backing material.

13 Claims, No Drawings

BOREABLE PLAIN BEARING MATERIAL

STATEMENT OF RELATED APPLICATION

The present application claims priority under 35 U.S.C. §119(e) from U.S. Provisional Application Ser. No. 60/451,500 filed Mar. 3, 2003, entitled "Enhanced Metal/Polymer Bearing Construction," the disclosure of which is incorporated herein by reference.

FIELD OF INVENTION

The present invention relates to bearings, plastic bearing materials, and to methods for the production thereof.

BACKGROUND OF INVENTION

Bearings with plastic-based overlays are known as single-layer, two-layer or three-layer composite materials. Single-layer bearing materials include solid plastic bearings. Two-layer bearing materials include bearings with an outer metallic backing and directly applied or adhered plastics. Three-layer bearing materials include bearings comprising a backing material, a porous layer, and a plastic-based covering layer formed in the pores. Each of these bearings may be useful in applications where the use of externally supplied lubricants may be difficult or undesirable.

With regard to the three-layer bearing materials, many different types of plastic bearing materials have been applied to a backing material, such as steel, having a porous metallic layer. The porous metallic layer may comprise bronze or copper particles sintered to a steel backing. The plastic bearing material may comprise a base polymer and filler particles. A useful plastic bearing material may include polytetrafluoroethylene (PTFE) as the base polymer.

The development of PTFE lined composite dry bearing material was begun by Glacier Metal Co. in 1948 and patents were granted for the materials during the 1950's. One of the materials developed was DU™. DU is a commercially successful bearing material combining dry wear properties of PTFE and the mechanical properties of conventional bearing material.

A process for impregnating a plastic bearing material into a porous metallic layer on a metal backing includes spreading a paste or dry powder onto the porous metallic layer, and the paste or dry powder is compacted into the pores via rolling. The paste or dry powder may be made by mixing an aqueous dispersion of PTFE with a filler material together with an organic lubricant (such as a volatile organic compounds "VOC's") and coagulating the dispersion to form a so-called "mush". Once the plastic bearing material is compacted into the porous layer, the backing material can be heated using an induction furnace to drive off any residual water and lubricant in the plastic bearing material. Heating the backing material may also melt or sinter the PTFE particles in contact with the porous layer and/or the backing material. Driving off the residual water can limit the thickness of the layer which may be formed above the porous layer ("overlay") due to blistering which can occur when thicker layers are attempted. Further, the evaporation of VOC's from the compacted plastic bearing material can degrade the integrity and porosity of the overlay. Too thin of an overlay can lead to limited wear resistance.

Alternatives to the method of spreading a coagulated polymer dispersion onto a porous metallic layer have been developed, such as creating a tape of PTFE for impregnation into a porous metal layer. Although PTFE may be classified as a thermoplastic, it does not melt like other typical thermoplastics. At its transition temperature, PTFE changes to a rubber-like state that may be unsuitable for melt processing.

In some processes, when a PTFE tape is impregnated into a porous layer, the backing material and the porous layer may be heated, and a portion of the overly may be left in an unsintered form. In other words, the PTFE may not be in a continuous consolidated form, thereby potentially giving poor wear properties to bearings made using such a method.

A method of producing sintered PTFE tape is to press and sinter a cylindrical block of the polymer, with or without the incorporation of fillers, and to skive off a tape from the surface of the cylinder. Alternatively melt extruded tape comprising substantially similar portions by volume of polyphenylene sulphide ("PPS") and PTFE may be impregnated into a heated porous layer disposed upon a heated backing material, as described in U.S. Pat. No. 5,665,825. The melt extrusion process is conducted at a temperature high enough to melt the PPS but low enough to avoid sintering the PTFE. This process can form interpenetrating networks of PPS and PTFE. Alternatively, the use of a conveyor and compressing roller system to produce PTFE based sheeting of tape is known. These forms of PTFE tape may not suitable for roll impregnation into porous metal sinter, because in some instances the PTFE may be sufficiently strong even above its transition temperature such that the rolling process may damage the porous metal sinter.

As a result, there is a need for three-layer bearing materials having greater overlay thickness that may extend bearing life by improving wear and erosion resistance while maintaining low friction. Thicker overlays may also allow for subsequent boring operations to be carried out in wrapped bushes. Further, there is a need for eliminating the use of VOC's in plastic bearing materials applied to a porous layer since avoiding the use of VOC's can improve the integrity and porosity of the overlay.

SUMMARY OF INVENTION

The present invention provides a bearing comprising: a backing material, a porous layer on said backing layer, and an extruded bearing material layer impregnated into the porous layer, wherein the bearing material layer is a continuous consolidated structure comprising a continuous polytetrafluoroethylene matrix and discrete particles of an additive material, wherein said bearing material layer has a portion above the porous layer.

In another aspect, the present invention provides a plastic bearing material comprising an extruded unsintered tape or strip operable to be impregnated into a porous layer disposed upon a backing material, wherein the extruded unsintered tape comprises a polytetrafluoroethylene matrix and discrete particles of an additive material.

In another aspect, the present invention provides a method of manufacture comprising: providing an extruded unsintered tape or strip comprising a polytetrafluoroethylene matrix and discrete particles of an additive material; impregnating said extruded unsintered tape into a porous layer disposed upon a backing material; sintering the impregnated unsintered tape at a temperature above the melting point of the polytetrafluoroethylene to form a continuous consolidated bearing material layer.

An advantage of the bearings and the method of manufacture of bearings of the present invention is that bearings can be substantially blister free because the extruded unsintered tape may not contain liquid lubricant in an amount that could cause blistering under the conditions used to sinter the tape. Conventional coagulated dispersion based materials can blister when surface layers of more than 35 microns are attempted. The method of the present invention can also produce a bearing having improved wear performance. The method can also provide overlays of a thickness that allows for subsequent boring operations to be carried out on wrapped bushes.

DETAILED DESCRIPTION

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

In a first aspect, the present invention provides a bearing comprising: a backing material, a porous layer on said backing layer, and an extruded bearing material layer impregnated into the porous layer, wherein the bearing material layer is a continuous consolidated structure comprising a continuous polytetrafluoroethylene matrix and discrete particles of an additive material, wherein said bearing material layer has a portion above the porous layer, referred to as the overlay. In an embodiment, the surface of the bearing material layer may be substantially free of blisters. In another embodiment, the additive particles may be microscopically and macroscopically homogeneously distributed within the PTFE polymer matrix.

The backing material may comprise any material operable to support the porous layer and withstand the processes of impregnating and sintering the bearing material layer. In an embodiment, the backing material of the bearing may comprise a metal strip. In another embodiment, the backing material may comprise a low carbon steel strip. In another embodiment, the backing material may comprise a metal strip being nickel or copper plated thereon to enhance adhesion of the porous layer.

The porous material may comprise any material operable to key the bearing material layer to the backing material. In an embodiment, the porous layer of the bearing may comprise bronze particles sintered to a metal backing material. In another embodiment, the porous layer may comprise copper particles sintered to a metal backing material.

The additive material may comprise any material suitable for incorporation into the extruded unsintered tape such that the tape is operable to be impregnated into the porous layer disposed upon the backing material and operable to withstand the processing temperatures used to consolidate the bearing material layer. Tapes that are operable to be impregnated into a porous layer disposed upon a backing material may include those that can be impregnated without compacting or closing up the pores of the porous layer, or those that can suitably adhere to the porous layer. Any amount of additive material may be included in the bearing material layer so long as enough PTFE is present to form a continuous consolidated layer.

In an embodiment, the additive material may comprise an inorganic particulate filler such as, but not limited to, ionic fluorides including calcium fluoride, magnesium fluoride, tin fluoride; metal oxides including for example, iron oxide, aluminum oxide, titanium dioxide, zinc oxide; and metal hydroxides such as aluminum hydroxide. In another embodiment, the additive material comprises an inorganic particulate filler comprising calcium fluoride. The particle size of the inorganic particulate filler may be determined by a size operable to improve the cavitation erosion resistance and wear resistance while retaining desirable low friction properties. In an embodiment of the bearing wherein the additive material comprises calcium fluoride, the calcium fluoride has a mean diameter particle size of less than or equal to 10 microns. In another embodiment, the calcium fluoride has a mean diameter particle size of less than or equal to 2 microns. In another embodiment, the amount of inorganic particulate filler in the bearing material layer is between 10 to 30% by volume.

In another embodiment, the additive material may comprise polyphenylene sulphide particles. In an embodiment, the amount of polyphenylene sulphide in the bearing material layer is between 30 and 70% by volume. In another embodiment, the amount of polyphenylene sulphide is 50% by volume. In another embodiment, the polyphenylene sulphide has a mean diameter particle size of less than or equal to 60 microns. In another embodiment, the polyphenylene sulphide has a mean diameter particle size of less than or equal to 20 microns.

In another embodiment, the bearing material layer may further comprise an organic filler material such as, but not limited to, Tetrafluoroethylene-perfluoroalkylvinylether copolymers, Tetrafluoroethylene-hexafluoropropylene copolymer, Tetrafluoroethylene propylene ether polymer, Tetrafluoroethylene-ethylene copolymers, Polychlorotrifluoroethylene polymers, Polychlorotrifluoroethylene-ethylene copolymers, Hexafluoroisobutylene polymers, Hexafluoroisobutylene-vinylidene fluoride copolymers or Hexafluoro propylene polymer. A melt processable organic filler material, such as those listed above, may be included to modify the crystallinity of the PTFE in the extruded unsintered tape and/or the bearing material layer.

The portion of the bearing material layer above the porous layer (i.e., overlay) may be determined by various factors. For example, the lower limit of the thickness of the overlay may be determined by the intended use of the bearing material or by the minimum thickness that can be machined without a significant reduction in a bearing's performance or wear resistance. In an embodiment, the thickness of the overlay is at least 25 microns. In another embodiment, the thickness of the overlay is at least 50 microns. The upper limit of the thickness of the overlay may be determined by the upper limit of tape thickness that is operable to be impregnated into the porous layer disposed upon the backing material. The upper limit of the thickness of the overlay may also be determined by the upper limit of tape thickness that can be dried to remove any liquid lubricants. In an embodiment, the thickness of the overlay is less than 300 microns. In another embodiment, the thickness of the overlay is less than 150 microns.

In another aspect, the present invention provides a plastic bearing material comprising an extruded unsintered tape or strip operable to be impregnated into a porous layer disposed upon a backing material, wherein the extruded unsintered tape comprises a polytetrafluoroethylene matrix and discrete particles of an additive material. In an embodiment, the additive particles are microscopically and macroscopically homogenously distributed within the polytetrafluoroethylene matrix. The plastic bearing material has a thickness operable to produce a bearing having a portion of the bearing material layer above the surface of a porous layer. In an embodiment, the plastic bearing material has a thickness of about 600 microns.

The extruded unsintered tape may be produced by methods described in U.S. Pat. No. 5,697,390 (herein incorporated by reference) where PTFE particles and additive particles are mixed with an air impact pulverizer and was then extruded to form a tape.

The additive material may comprise any material suitable for incorporation into the extruded unsintered tape such that the tape is operable to be impregnated into a porous layer disposed upon a backing material. Any amount of additive material may be included in the plastic bearing material so long as the amount of PTFE is operable to form a continuous consolidated PTFE matrix.

In an embodiment, the additive material may comprise an inorganic particulate filler such as, but not limited to, ionic fluorides including calcium fluoride, magnesium fluoride, tin fluoride; metal oxides including for example, iron oxide, aluminum oxide, titanium dioxide, zinc oxide; and metal hydroxides such as aluminum hydroxide. In another embodiment, the additive material comprises an inorganic particulate filler comprising calcium fluoride. The particle size of the inorganic particulate filler may be determined by a size operable to improve the cavitation erosion resistance and wear resistance while retaining desirable low friction properties. In an embodiment wherein the extruded unsintered tape comprises calcium fluoride, the calcium fluoride has a mean diameter particle size of less than or equal to 10 microns. In another embodiment, the calcium fluoride has a mean diameter particle size of less than or equal to 2 microns. In another embodiment, the amount of inorganic particulate filler in the extruded unsintered tape is between 10 to 30% by volume.

In another embodiment, the additive material may comprise a polymeric material comprising polyphenylene sulphide. In an embodiment, the amount of polyphenylene sulphide in the extruded unsintered tape is between 30 and 70% by volume. In another embodiment, the amount of polyphenylene sulphide is 50% by volume. In another embodiment, the polyphenylene sulphide has a mean diameter particle size of less than or equal to 60 microns. In another embodiment, the polyphenylene sulphide has a mean diameter particle size of about 20 microns.

In another embodiment, the extruded unsintered tape may further comprise an organic filler material such as, but not limited to, Tetrafluoroethylene-perfluoroalkylvinylether copolymers, Tetrafluoroethylene-hexafluoropropylene copolymer, Tetrafluoroethylene propylene ether polymer, Tetrafluoroethylene-ethylene copolymers, Polychlorotrifluoroethylene polymers, Polychlorotrifluoroethylene-ethylene copolymers, Hexafluoroisobutylene polymers, Hexafluoroisobutylene-vinylidene fluoride copolymers and Hexafluoro propylene polymer.

In another aspect, the present invention provides a method of manufacture comprising: providing an extruded unsintered tape or strip comprising a polytetrafluoroethylene matrix and discrete particles of an additive material; impregnating said extruded unsintered tape into a porous layer disposed upon a backing material; sintering the impregnated unsintered tape at a temperature above the melting point of the polytetrafluoroethylene to form a continuous consolidated bearing material layer.

The extruded unsintered tape may be produced by methods described in U.S. Pat. No. 5,697,390 (herein incorporated by reference) where PTFE particles and additive particles are blended with an air impact pulverizer and then extruded to form a tape. Other methods known to one skilled in the art may be used to blend PTFE particles and additive particles before extruding the mixture to form an extruded unsintered tape. The particle size of the PTFE particles used to provide an extruded unsintered tape may be any size so long as the PTFE particles are operable to form a continuous consolidated polymer matrix when used in a bearing material layer. In an embodiment, the particle size of the PTFE particles is between 500 and 600 microns. In another embodiment, the additive material is microscopically and macroscopically homogenously distributed within the polytetrafluoroethylene matrix.

The additive material may comprise any material suitable for incorporation into the extruded unsintered tape such that the tape is operable to be impregnated into the porous layer disposed upon the backing material. Any amount of additive material may be included in the extruded unsintered tape so long as enough is PTFE present to form a continuous consolidated PTFE matrix.

In an embodiment, the additive material may comprise an inorganic particulate filler such as, but not limited to, ionic fluorides including calcium fluoride, magnesium fluoride, tin fluoride; metal oxides including for example, iron oxide, aluminum oxide, titanium dioxide, zinc oxide; and metal hydroxides such as aluminum hydroxide. In another embodiment, the additive material comprises an inorganic particulate filler comprising calcium fluoride. The particle size of the inorganic particulate filler material may be determined by sizes operable to improve the cavitation erosion resistance and wear resistance while retaining desirable low friction properties. In an embodiment wherein extruded unsintered tape comprises calcium fluoride, the calcium fluoride has a mean diameter particle size of less than or equal to 10 microns. In another embodiment, the calcium fluoride has a mean diameter particle size of less than or equal to 2 microns. In another embodiment, the amount of inorganic particulate filler in the extruded unsintered tape comprises is between 10 to 30% by volume.

In another embodiment, the additive material may comprise polyphenylene sulphide. In an embodiment, the amount of polyphenylene sulphide in the extruded unsintered tape is between 30 and 70% by volume. In another embodiment, the amount of polyphenylene sulphide is 50% by volume. In another embodiment, the polyphenylene sulphide has a mean diameter particle size of less than or equal to 60 microns. In another embodiment, the polyphenylene sulphide has a mean diameter particle size of about 20 microns.

In another embodiment, the extruded unsintered tape may further comprise an organic filler material such as, but not limited to, Tetrafluoroethylene-perfluoroalkylvinylether copolymers, Tetrafluoroethylene-hexafluoropropylene copolymer, Tetrafluoroethylene propylene ether polymer, Tetrafluoroethylene-ethylene copolymers, Polychlorotrifluoroethylene polymers, Polychlorotrifluoroethylene-ethylene copolymers, Hexafluoroisobutylene polymers, Hexafluoroisobutylene-vinylidene fluoride copolymers and Hexafluoro propylene polymer.

As described in U.S. Pat. No. 5,697,390, liquid lubricants may be used when blending and/or extruding blended particle mixture for ram extrusion to form the extruded unsintered tape. The lubricant can function to ensure acceptable extrusion of the unsintered tape. Any liquid lubricant known to one skilled in the art can be used so long as the lubricant can be removed from the extruded unsintered tape without rendering the tape inoperable to be impregnated into a porous layer.

The extrusion process is conducted under conditions and temperatures that do not melt any polymeric material within the blended particle mixture. In one embodiment, a blended particle mixture of PTFE particles and additive particles is ram extruded under conditions that do not melt any polymeric material within the blended particle mixture. The resulting tape is soft and pliable and operable to be impregnated into a porous layer without heat and/or excessive pressure. In an embodiment, discrete particles of additive material in the extruded unsintered tape may be homogeneously distributed throughout the tape and a continuous PTFE matrix is maintained.

Prior to impregnating the extruded unsintered tape, the tape may be dried, especially if the blended particle mixture of PTFE particles and additive material included a liquid lubricant. The conditions and temperature at which the extruded unsintered tape may be dried do not operate to sinter or melt any polymeric material within the tape, such as polytetrafluoroethylene or polyphenylene sulphide particles. The step of drying is operable to remove enough liquid lubricant to preclude blistering during further processing. In an embodiment, the extruded unsintered tape is substantially free of a liquid lubricant. The extruded unsintered tape may be dried using methods described in U.S. Pat. No. 5,697,390.

The extruded unsintered tape may be impregnated into the porous layer by means of a rolling mill for example. The step of impregnating is conducted under conditions and temperatures that do not sinter the tape or melt any polymer material in the tape.

The porous layer into which the tape is impregnated may be bronze particles sintered to a metal backing such as steel, for example, as is known in the art. In this way, a strip bearing material may be formed from which cylindrical or semi-cylindrical bearings, for example, may be produced by known methods.

After impregnating the extruded unsintered tape into a porous layer to form a bearing material layer, the bearing material layer is sintered to produce a three-layer composite material comprising a continuous consolidated bearing material layer. In an embodiment, all of the PTFE in the bearing material layer is sintered.

As used herein, sintering or consolidating a tape or bearing material layer refers to heating PTFE to its melting point or above. When PTFE is heated above its melting point, which may be between 350 and 425° C., the PTFE is consolidated or densified. Before heating above its melting point, PTFE is relatively soft and can be manipulated into structures such as a porous layer with minimal applied force and without heat.

In an embodiment, the method of manufacture can produce a three-layer material or composite wherein the bearing material layer is substantially free of blisters. In another embodiment, the method of manufacture can produce a three-layer material having a portion of the bearing material layer above the surface of the porous layer. The thickness of the portion of the bearing material layer above the surface of the porous layer (i.e. overlay) may be at least 25 microns. In another embodiment, the overlay may be at least 50 microns. In another embodiment, the thickness of the overlay may be less than 300 microns. In another embodiment, the thickness of the overlay may be less than 150 microns. To accurately manufacture a three-layer material having a consistent overlay thickness, the formed three layer material may be given a final size rolling operation. Each step in the method of the present invention may be performed as part of a continuous process.

An advantage of the bearings and the method of manufacture of bearings of the present invention is that bearings can be substantially blister free because the extruded unsintered tape does not contain liquid lubricant in an amount that could cause blistering under the conditions used to sinter or consolidate the tape. In various prior art methods, liquid lubricants such as water and/or VOC's are removed after impregnation which can cause increased porosity and formation of blisters. Further, conventional coagulated dispersion based materials may blister when surface layers of more than 35 microns are attempted. The method of the present invention can also produce a bearing that is boreable to allow accurate sizing by machining.

The test results for materials prepared by the method of manufacture described herein have shown that thicker overlays can be achieved allowing subsequent boring operations to be carried out on wrapped bushes. Furthermore, the material and process technology can result in improvements in dry wear performance and improved erosion resistance being achieved while maintaining acceptable levels of friction.

EXAMPLES

Example 1

A granular powder mixture comprising about 80% PTFE by volume and about 20% $CaF_2$ by volume was added to a ram extruder. The PTFE had a particle size of between 500 and 600 microns. The calcium fluoride had a mean diameter particle size of about 2 microns. The granular powder mixture also included a liquid lubricant. The granular powder mixture was blended using conventional blending techniques.

The granular powder mixture was passed through a die of a ram extruder to produce a strip or tape of extruded unsintered tape. The tape had a thickness of about 300 microns. Following extrusion, the tape was dried in the process of extrusion and calendaring.

The tape was impregnated into a porous bronze metallic layer disposed upon a steel backing material at a temperature below the melting point of PTFE to form a bearing material layer. The extruded unsintered tape was impregnated by passing the tape and the backing material through a rolling mill which causes the bearing material layer to be impregnated into the porosity of the porous layer. The step of impregnating also leaves a portion of the bearing material layer above the surface of the bronze porous layer.

The impregnated extruded unsintered tape was then passed through a continuous sintering oven at a temperature of about 400° C., which allowed a residence time at this temperature of approximately 30 seconds. The residence time was a period operable to sinter the impregnated extruded tape to form a continuous consolidated bearing material layer. The composite strip was then passed through a second rolling mill to effect a size rolling operation to the strip to produce an accurate overall thickness. The final composite material had an overlay thickness of about 65 microns.

Example 2

An extruded unsintered tape comprising about 50% PTFE by volume and about 50% PPS by volume was prepared as described above with the following exceptions. The PTFE and PPS were blended using an air impact pulverizer, and the oven temperature was about 365° C. The final composite material had an overlay thickness of about 65 microns.

Strips of composite material produced according to Example 2 were formed into bearing bushes and dry wear tested using an apparatus similar to that described in FIG. 2 and the related text in "Materials for Plain Bearings: Review 174," *Int. Mellalurgical Rev.*, vol. 18 (1973). Commercially available bearing materials DU™ (PTFE and Pb mush) and DP4™ (PTFE and PPS melt extruded tape, see U.S. Pat. No. 5,911,514 were also tested. See summary of test results in Table 1.

The dry sliding test conditions were: Load: 115 psi; and Shaft Speed: 175 ft/min; 20,000 psi-fpm; 0.7 MPa-m/s.

TABLE 1

Summary of Dry Wear Tests

| Sample | Composition of bearing layer material | Overlay Thickness | High Speed Dry Wear Life |
|---|---|---|---|
| Example 2 | PTFE, PPS | 65 microns | >3200 hours |
| DU ™ | PTFE, Pb | 25 microns | 670 hours |
| DP4 ™ | PTFE, $CaF_2$, aramid fibers | 35 microns | <300 hours |

Thus it may be seen from the results that the material and method of the present invention provides a significant improvement in dry wear performance over materials known in the art.

In summary, numerous benefits have been described which result from employing the concepts of the invention. The foregoing description of embodiments of the invention has been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method of manufacture comprising:
   providing a particulate mixture of polytetrafluoroethylene and an inorganic filler material;
   forcing said mixture through a ram extruder to form an extruded, shape-retaining, unsintered tape or strip;
   impregnating said extruded unsintered tape into a porous layer disposed upon a backing material;
   sintering the impregnated unsintered tape at a temperature above the melting point of the polytetrafluoroethylene to form a continuous consolidated bearing material layer.

2. The method of claim 1, wherein the additive particles are microscopically and macroscopically homogeneously distributed within the polytetrafluoroethylene matrix.

3. The method of claim 1, wherein said backing material is a metal strip.

4. The method of claim 2, wherein the porous layer comprises bronze particles sintered to the metal backing.

5. The method of claim 1, wherein the additive material comprises an inorganic particulate filler.

6. The method of claim 5, wherein the extruded unsintered tape comprises 10 to 30% by volume of inorganic filler material.

7. The method of claim 1, wherein the extruded unsintered tape further comprises a polymeric material.

8. The method of claim 1, wherein the extruded unsintered tape comprises polyphenylene sulphide.

9. The method of claim 8, wherein the extruded unsintered tape comprises 30 to 70% by volume of polyphenylene sulphide.

10. The method of claim 1, wherein the extruded unsintered tape layer is impregnated at a temperature below the melting point of polytetrafluoroethylene.

11. A method of manufacture comprising:
    providing an extruded unsintered tape or strip comprising a polytetrafluoroethylene matrix and discrete particles of an additive material;
    drying the unsintered tape at a temperature sufficient to remove a lubricant liquid from the unsintered tape before impregnating the unsintered tape into a porous layer;
    impregnating said extruded unsintered tape into a porous layer disposed upon a backing material;
    sintering the impregnated unsintered tape at a temperature above the melting point of the polytetrafluoroethylene to form a continuous consolidated bearing material layer.

12. The method of claim 1, wherein the steps are a continuous process.

13. The method of claim 1, wherein a portion of the bearing material layer is above the surface of the porous layer.

* * * * *